US006146728A

United States Patent [19]
Bay

[11] Patent Number: 6,146,728
[45] Date of Patent: Nov. 14, 2000

[54] BINDER STRIPS ON A CARRIER FILM, AND METHOD AND APPARATUS FOR APPLYING BINDER STRIPS ONTO SHEET GOODS

[76] Inventor: Christian Bay, Luzernstrasse 45, CH-4553 Subingen, Switzerland

[21] Appl. No.: 09/028,756

[22] Filed: Feb. 24, 1998

[30] Foreign Application Priority Data

Feb. 27, 1997 [CH] Switzerland ............................ 0458/97

[51] Int. Cl.[7] ................................ B31F 5/00; B32B 9/00

[52] U.S. Cl. ........................ 428/40.1; 24/67 AR; 24/304; 156/196; 156/201; 156/202; 156/584; 402/79; 428/53; 428/58; 428/192; 428/194

[58] Field of Search .................................... 428/906, 192, 428/194, 40.1, 53, 57, 58; 24/67 AR, 304; 402/79; 156/196, 201, 202, 584

[56] References Cited

U.S. PATENT DOCUMENTS

| | | | |
|---|---|---|---|
| 3,884,443 | 5/1975 | McMaster | 248/467 |
| 5,364,200 | 11/1994 | Russo et al. | 402/79 |
| 5,524,998 | 6/1996 | Schwartz | 402/79 |
| 5,609,933 | 3/1997 | Stepanek | 428/40.1 |
| 5,683,194 | 11/1997 | Emmel et al. | 402/79 |

FOREIGN PATENT DOCUMENTS

WO97/00779 1/1997 WIPO .

*Primary Examiner*—Nasser Ahmad
*Assistant Examiner*—Derek Jessen
*Attorney, Agent, or Firm*—W. F. Fasse; W. G. Fasse

[57] ABSTRACT

A plurality of binder strips (2) are removably arranged successively one after another on a band-shaped carrier film (1), with the lengthwise direction of the binder strips arranged perpendicular to the lengthwise direction of the carrier film. Each binder strip (2) includes an adherent portion (3) having an adhesive on a bottom surface thereof, and a non-adherent portion (7) having holes punched therein suitable for being received on a ring binder or prong fastener or the like. The carrier film (1) has registration marks (6) provided thereon, so that the carrier film can be automatically advanced and sharply deflected over a release edge (14) in an apparatus, whereby the successive binder strips (2) are released from the carrier film (1) and adhered onto a page (16) of sheet goods being advanced through an adjacently located sheet folding machine. Thereby, the binder strips (2) are automatically adhered onto the edge of the page (16) so that the adherent portion (3) is adhered onto the page edge, while the hole-punched portion (7) protrudes beyond the page edge, without requiring any manual steps, directly in a sheet folding machine.

28 Claims, 3 Drawing Sheets

BINDER STRIPS ON A CARRIER FILM, AND METHOD AND APPARATUS FOR APPLYING BINDER STRIPS ONTO SHEET GOODS

PRIORITY CLAIM

This application is based on and claims the priority under 35 U.S.C. §119 of Swiss Patent Application 1997 0458/97, filed on Feb. 27, 1997.

FIELD OF THE INVENTION

The invention relates to binder strips that have holes therein and that can be adhered to respective edges of sheet goods for reinforcing binder holes in the sheet goods or for providing binder holes by which the sheet goods may be bound in a binder. A plurality of the binder strips are arranged in succession along a carrier film. The invention further relates to a method and an apparatus for removing the binder strips from the carrier film and applying them onto respective pages of sheet goods.

BACKGROUND INFORMATION

In order to bind sheet goods, such as paper pages and especially large format newsprint pages or the like, into ring binders or onto prong fasteners or the like, it is known to punch holes along the edge of the sheet good pages, whereby the binder rings or fastener prongs may then be passed through the holes in order to bind the pages. It is also known to arrange reinforcement strips of plastic or hard paper over the hole-punched area of the sheet edges in order to reinforce the holes and thus prevent tearing and the like. Typically, such reinforcing strips are applied manually onto each page.

It is further known to avoid punching holes in the sheet good pages themselves, by adhering a binder strip onto the edge of the sheet good pages, so that a portion of the binder strip having holes therein protrudes beyond the edge of the sheet good pages. The holes in the binder strip may then be mounted on the binder rings or fastener prongs or the like. Such binder strips are also typically applied onto the respective pages by hand.

SUMMARY OF THE INVENTION

It is an object of the invention to provide an arrangement of plural binder strips on a carrier film in such a manner that the binder strips can be individually removed from the carrier film and adhered onto the edge of sheet good pages by an automatic machine, while avoiding manual operations, and while ensuring that an adherent portion of each binder strip is securely adhered to the respective page of sheet goods and a protruding portion of the binder strip having holes therein properly protrudes from the edge of the page. It is a further object of the invention to provide a method and an apparatus for automatically removing individual binder strips from a carrier film in succession, and directly adhering the binder strips onto respective sheet good pages, in a simple manner, using simple equipment, and using a relatively small amount of the carrier film. The invention further aims to avoid or overcome the disadvantages of the prior art, and to achieve additional advantages, as apparent from the present description.

The above objects have been achieved according to the invention in an arrangement of a plurality of binder strips removably adhered one after another in succession on a strip-shaped carrier film. The elongate binder strips are arranged with their respective lengthwise direction extending perpendicularly to the lengthwise direction of the carrier film. A first adherent portion of each binder strip is provided with a pressure sensitive contact adhesive on a backside thereof, which is removably adhered to the carrier film. A second protruding portion of each binder strip is not provided with adhesive, but has holes (or pre-punched areas for later forming holes) therein, at a proper spacing from each other and in a proper configuration adapted to be received in a standardized binder or prong fastener. The carrier film or the binder strips, but preferably the carrier film, has registration marks provided thereon for indicating the spacing or pitch interval between successive binder strips on the carrier film. The binder strips may be arranged with a free space respectively therebetween. The entire binder strip may be made of a single piece of transparent plastic, or separate pieces of plastic or separate pieces of different materials, which are bonded together.

The above objects have further been achieved according to the invention in a method and an apparatus for applying binder strips from a carrier film onto pages of sheet goods. The carrier film with binder strips arranged thereon is provided in rolled-up form on a supply roll. The carrier film with binder strips thereon is unrolled from the supply roll, is sharply deflected through a sharp radius turn over a binder strip release edge, and is then directed to a waste take-up roll. As the carrier film passes over the binder strip release edge, the respective binder strip is released from the carrier film and positioned to be adhered onto the edge of a page of sheet goods, for example in a sheet folding machine. Depending on the relative arrangement of the present apparatus with the sheet folding machine, and depending on the sheet feed advance direction in the folding machine, the binder strips are arranged on the carrier film either with the respective adherent portions forward in the feed advance direction of the carrier film or with the non-adherent protruding portions forward in the feed advance direction of the carrier film, such that the adherent portion of each binder strip is adhered to the edge of the respective page while the non-adherent protruding portion properly protrudes from the edge of the page.

With the above described inventive features, it is possible to easily and reliably apply binder strips onto sheet good pages, and particularly onto large format newspaper sheets, in an automatic process avoiding manual operations. Since each binder strip, which respectively includes an adherent portion and a non-adherent protruding portion, is arranged on the strip- or band-shaped carrier film perpendicularly to the lengthwise feed advance direction thereof, it is simple to release the binder strips from the carrier film and immediately directly adhere the binder strips onto the respective sheet good pages, in such a manner that the non-adherent hole-punched protruding portion of each binder strip properly protrudes beyond the edge of the respective page. After the binder strips are applied, for example automatically in a sheet folding machine, the respective pages may continue in the process to be folded in a typical manner so that the finished sheet goods can easily be bound in a binder or the like in a space-saving and reliable manner.

The use of a carrier film avoids the need for providing a separate release paper or protective film on each binder strip, and also avoids having the binder strips adhered to each other, i.e. respectively adhered to an adjacent binder strip. The registration marks on the carrier film or on the binder strips allow automatic feed advance control and registration of the binder strips to properly align with the sheet good edges.

BRIEF DESCRIPTION OF THE DRAWINGS

In order that the invention may be clearly understood, it will now be described, in connection with an example embodiment of the invention, with reference to the drawings, wherein.

DETAILED DESCRIPTION OF PREFERRED EXAMPLE EMBODIMENTS AND OF THE BEST MODE OF THE INVENTION

Figure 1:
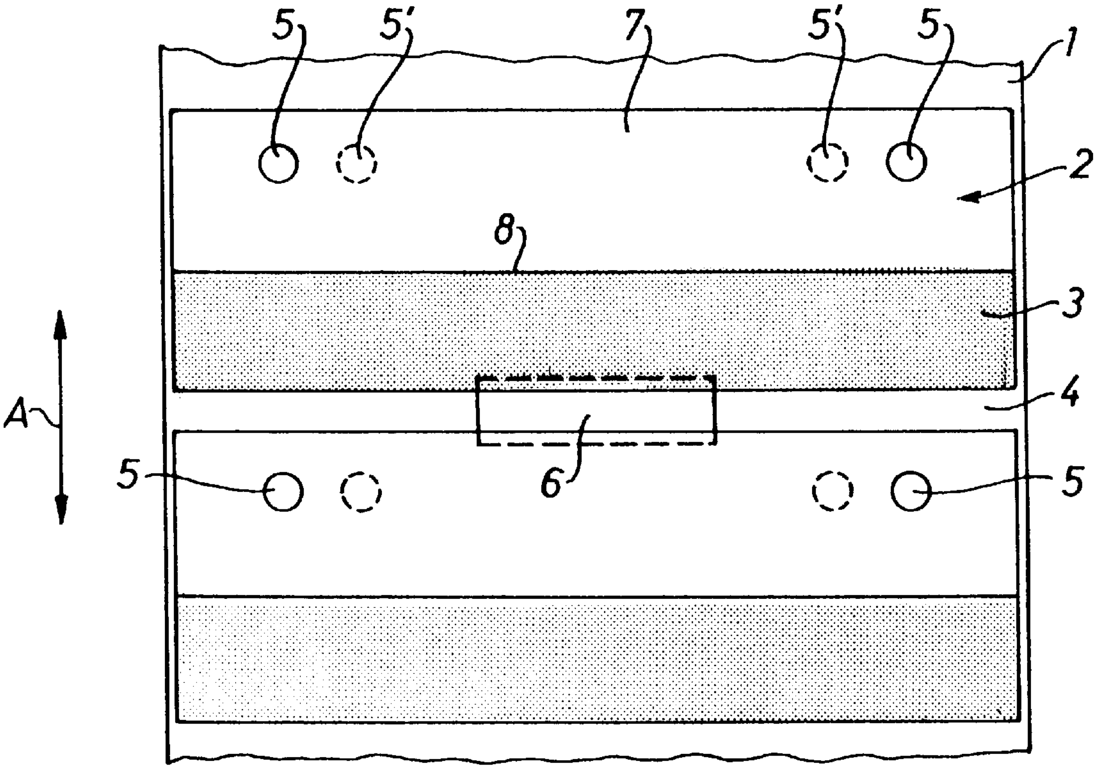
FIG. 1 is a plan view of a carrier film with a plurality of binder strips arranged thereon in accordance with a first embodiment of the invention, with respective spacings between adjacent binder strips.

FIG. 1 shows a band- or strip-shaped carrier film 1 with a single row of elongate binder strips 2 removably arranged successively one after another on the carrier film 1. The carrier film 1 is preferably a continuous strip or band of a film of a flexible plastic or a paper-like material. For example the band or strip has a length that may be one or several hundred times the width thereof. It should be understood that the term carrier film as used herein not only refers to synthetic plastic films, but also refers to films or strips of paper or coated paper or any other thin flexible substrate strip.

The binder strips 2 each have a rectangular format with their respective lengthwise dimension arranged at least substantially perpendicular (i.e. within a few degrees of perpendicular) to the lengthwise running direction A of the carrier film 1. The length of each binder strip 2 corresponds approximately to the width of the carrier film 1, and the edges of the binder strips 2 do not protrude beyond the edges of the carrier film as shown in FIG. 1. Adjacent binder strips 2 are spaced apart from one another with a blank space 4 therebetween in the lengthwise direction A of the carrier film 1, in the embodiment shown in FIG. 1.

Each binder strip 2 comprises a first adherent portion 3 provided with a pressure sensitive contact adhesive 3' on a bottom or backside thereof, as well as a non-adherent protruding portion 7 that is not provided with adhesive thereon. The boundary 8 between the two portions 3 and 7 may either be an actual boundary between different materials or may simply be a boundary between the adhesive area and the non-adhesive area. This boundary 8 runs along the lengthwise direction of the binder strip 2, approximately in the middle of the width of the binder strip, or offset from the middle so that one or the other portion 3 or 7 may be wider than the other if desired for a particular application.

At least one pair of holes 5 is provided respectively in the non-adherent portion 7 of each binder strip 2, whereby the spacing between the holes 5 corresponds to a standardized spacing of ring binders or prong fasteners or the like, and for example may be 8 cm to correspond to standard European binders. Alternatively, the spacing between the holes 5 can be any dimension as desired for a particular application. Also, additional holes or pre-punched or pre-perforated hole locations 5' can additionally be provided in the non-adherent portion 7 of each binder strip 2, to allow the final user to finish the punch-out of the respective desired holes. In other words, it is possible that punching waste or plugs still remain in the holes 5, or that the holes are not completely punched through.

Preferably, each binder strip 2 is made of a single piece of material, which is preferably a synthetic plastic film, that is preferably thicker than the carrier film 1. The plastic film of the binder strips 2 may be completely glass-clear transparent, translucent, or opaque, or may even be colored as desired. As a variation, the binder strips 2 may respectively be made of two parts bonded together, for example whereby the non-adherent hole-punched portion 7 is made of a tear-resistant silicone coated paper while the adherent portion 3 is made of a plastic film.

Figure 2:
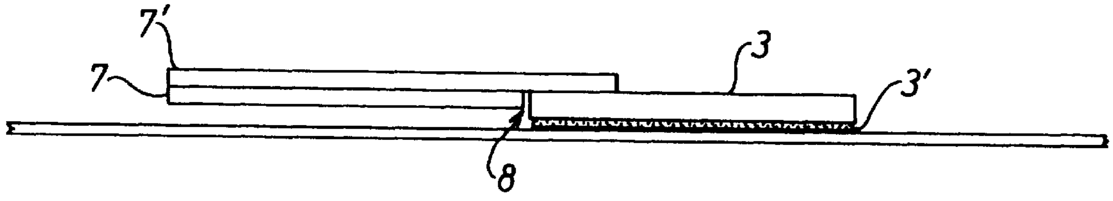
FIG. 2 is a schematic cross-sectional view of one embodiment of a single binder strip (without the carrier film) according to the invention.

The paper portion may remain exposed to allow writing or marking thereon. According to a further variant as shown in FIG. 2, each binder strip 2 may have a three-part construction, including a thicker and stiffer plastic film forming the adherent portion 3, a paper strip forming the non-adherent hole-punched portion 7, and a thinner and more flexible plastic film 7' forming a surface coating of the non-adherent portion 7 and bonding the portion 7 onto the portion 3. In this manner, the plastic film 7' forms a flexible hinge along the boundary line 8.

The adhesive 3' on the back or underside of the adherent portion 3 removably adheres the respective binder strips 2 onto the carrier film 1. In order to ensure the easy removal or release of the binder strips 2 from the carrier film 1, the carrier film 1 and/or the binder strips 2 may comprise a silicone surface coating that releases the adhesive 3'.

In each respective free space 4 between two adjacent binder strips 2, an index mark or registration mark 6 is provided on the carrier film 1 in order to determine the spacing or pitch between successive binder strips 2. This registration mark 6 preferably is in the form of a dark stripe located at least approximately in the middle of the width of the carrier film 1 and extending with its lengthwise direction parallel to the lengthwise direction of the binder strips 2. Alternatively, the registration marks 6 could be provided at any other convenient location where they may be scanned or detected by a photocell 22 or a feeler or other switch as will be described below. Most simply, these registration marks 6 are ink or dye marks that are printed directly onto the carrier film 1, but alternatively the registration marks 6 may comprise holes or notches that are sensed by a switch or that are engaged by a sprocket wheel. As will be described below, the photocell 22 or switch that detects the registration marks 6 works in cooperation with a control apparatus for controlling the drive of the feed advance motor 20 for advancing the carrier film 1.

Figure 3:
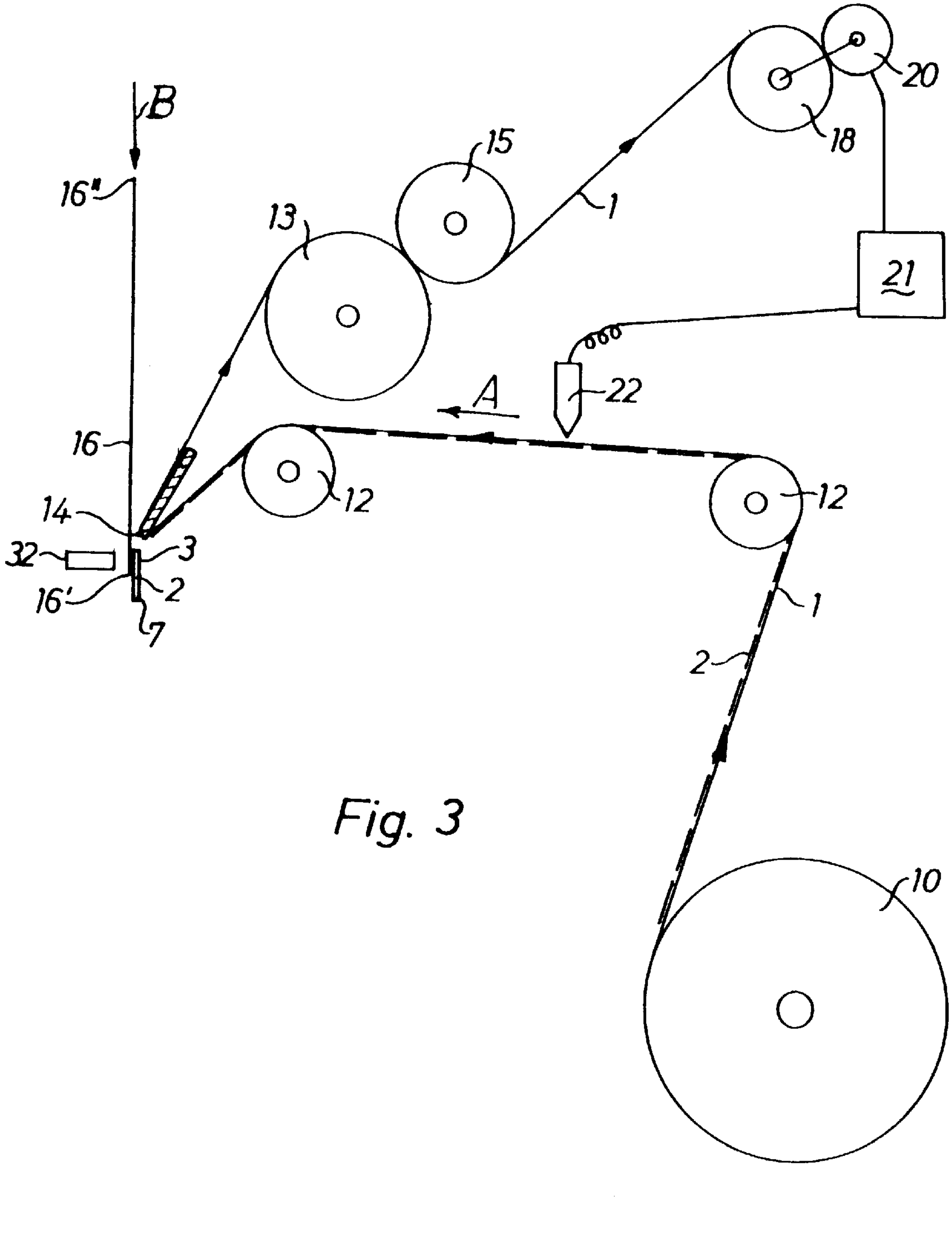
FIG. 3 is a schematic side view of an apparatus for carrying out a method of removing the binder strips from the carrier film and adhering the binder strips onto pages of sheet goods according to the invention.

FIG. 3 schematically illustrates an apparatus as well as a method for removing the binder strips 2 from the carrier film 1 and applying the binder strips 2 onto a page 16 of sheet goods. The carrier film 1 with the binder strips 2 removably arranged thereon is rolled up on a supply roll 10. Depending on the relative arrangement of the carrier film feed apparatus and the apparatus for advancing the sheet good pages 16, the carrier film 1 is rolled onto the supply roll 10 in either of two directions. Namely, the carrier film 1 may be rolled in a direction so that the adherent portion 3 of each binder strip 2 is oriented forwards in the feed advance direction A, or alternatively the carrier film 1 may be rolled so that the non-adherent protruding portion 7 of each binder strip 2 is oriented forwards in the feed advance direction A as represented in the embodiment shown in FIG. 3. With the orientation of each binder strip 2 as shown in FIG. 3, the binder strip 2 will be applied onto, and with the non-adherent portion 7 protruding from, a leading edge 16' of the page 16 being advanced in the direction B as will be described below. The alternative arrangement with the adherent portion 3 of each binder strip 2 oriented forwards in the direction A would pertain when the binder strip 2 is to be applied to a trailing edge 16" of each page 16, for example.

After being unrolled from the supply roll 10, the carrier film 1 with the binder strips 2 thereon is guided over deflection rollers or idler rollers 12, and is then sharply deflected over a binder strip release edge 14 in such a manner that the carrier film 1 goes through a bend of more than 90° and preferably more than 135°, whereby the binder strips 2 are released from the carrier film 1. The release of the binder strips is enhanced if the binder strips 2 are stiffer than the carrier film 1 and thus do not freely deflect around the sharp turn along with the positively moved carrier film 1.

The release edge 14 contacts the back surface of the carrier film 1 opposite the surface having the binder strips 2 thereon, and forms a deflection line running parallel to and closely adjacent the plane of the page 16. Thus, as the successive binder strips 2 are released from the carrier film 1 over the release edge 14, they are presented and adhered onto the leading edge 16' or the trailing edge 16" of the page 16, depending upon the relative timing of the page advance and the feed advance of the carrier film 1, and depending on the direction or orientation of the binder strips 2 on the carrier film 1 as discussed above. The page 16 is, for example, a large format page of sheet goods that has not yet been folded, and that is being advanced in a vertical sheet advance direction B in a sheet folding machine. The sheet advance B may alternatively take place in a horizontal or inclined direction. The apparatus can also be arranged so that the binder strips 2 are adhered onto a page 16 after it has been partially or completely folded, for example folded in the lengthwise direction. In any event, the binder strips 2 are applied onto the edge of the page 16 so that the adherent portion 3 is adhered to the edge of the page 16, while the non-adherent hole-punched portion 7 protrudes beyond the page edge. The placement and adhesion of the binder strips 2 onto the page 16 may be carried out using additional pressure rollers, or by simply arranging the release edge 14 substantially in contact with or very closely adjacent the page 16.

Downstream of the release edge 14, the empty carrier film 1, which forms waste, is conveyed over traction rollers 13 and 15 onto a waste take-up roll 18, which is driven by a motor 20. A photocell 22 is arranged to sense and detect the registration marks 6 and provide a corresponding registration signal that is used to control the operation of the motor 20 through a control unit 21. The control unit 21 also receives a synchronizing signal from the sheet folding machine to synchronize the feed advance of the binder strips 2 with the feed advance of the sheet good pages 16. Thus, the motor 20 is activated as soon as a respective sheet or page 16 has been advanced in the folding machine to a predetermined position for adhering a binder strip 2 onto an edge thereof. The position of the sheet or page 16 can be determined by a photocell or a microswitch 32 or the like.

The entire carrier film advancing apparatus including the supply roll 10, the release edge 14, the waste take-up roll 18, as well as the idler rolls and traction rolls, is mounted on a frame or carriage that can be movably arranged on a folding machine or the like so as to be slidable into different positions thereon, so as to accommodate different sheet formats or the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An arrangement comprising:

a strip-shaped carrier film extending longitudinally in a lengthwise direction, and a plurality of binder strips which each have an elongate shape, and which each comprise an adherent portion extending along said elongate shape, an adhesive provided on a back surface of said adherent portion facing said carrier film, and a non-adherent portion extending parallel to said adherent portion along said elongate shape, wherein said adhesive is not provided on said non-adherent portion, and wherein at least two holes or pre-scored punches for forming holes are provided in said non-adherent portion, wherein said binder strips are arranged respectively offset one after another and spaced apart from one another in at least one row along said carrier film with respective free spaces between adjacent ones of said binder strips and with said elongate shape of each said binder strip and said adherent portion oriented perpendicular to said lengthwise direction of said strip-shaped carrier film, wherein each said binder strip has a length of said elongate shape that corresponds approximately to a width of said carrier film perpendicular to said lengthwise direction, wherein said adherent portions of said binder strips are removably adhered onto said carrier film by said adhesive, and said non-adherent portions of said binder strips non-adheringly extend over said carrier film in said lengthwise direction, wherein at least said adherent portion of each said binder strip is stiffer than said carrier film, further comprising an adhesive release coating provided on said carrier film or on said binder strips and adapted to release said adhesive if said carrier film is deflected over a sharp release edge, and further comprising a plurality of registration marks provided on said carrier film or on said binder strips, with a uniform spacing between successive adjacent ones of said registration marks corresponding to a pitch spacing of said binder strips arranged one after another along said carrier film.

2. The arrangement of claim 1, wherein said holes or pre-scored punches provided in said non-adherent portion are spaced apart from each other at a standardized spacing adapted to match a ring or prong binder spacing.

3. The arrangement of claim 1, wherein said registration marks comprise stripes extending perpendicularly to said lengthwise direction of said strip-shaped carrier film.

4. The arrangement of claim 1, wherein said registration marks are optically detectable marks.

5. The arrangement of claim 1, wherein said registration marks are arranged on said carrier film at least partially in said respective free spaces.

6. The arrangement of claim 1, wherein said binder strips are arranged on a front surface of said carrier film, and said registration marks are arranged on a back surface of said carrier film opposite said front surface.

7. The arrangement of claim 1, wherein said carrier film and said binder strips each respectively comprise a transparent synthetic plastic material.

8. The arrangement of claim 1, wherein said non-adherent portion and said adherent portion of each said binder strip are distinct components respectively comprising different materials.

9. The arrangement of claim 8, wherein said adherent portion is stiffer than said non-adherent portion of each said binder strip.

10. The arrangement of claim 1, wherein each said binder strip is an integral one-piece component including said adherent portion and said non-adherent portion.

11. The arrangement of claim 1, wherein each said binder strip comprises a first strip that forms said adherent portion, a second strip that is distinct from said first strip and that forms said non-adherent portion, and a third strip that overlaps and flexibly bonds together said first strip and said second strip.

12. The arrangement of claim 11, wherein said first strip comprises a first transparent plastic strip, said second strip comprises an opaque paper strip, and said third strip comprises a second transparent plastic strip that is more flexible than said first transparent plastic strip.

13. The arrangement of claim 1, wherein said carrier film with said binder strips thereon is arranged in a rolled-up configuration, with said binder strips respectively oriented with said adherent portions directed toward a free end of said carrier film at an outside of said rolled-up configuration.

14. The arrangement of claim 1, wherein said carrier film with said binder strips thereon is arranged in a rolled-up configuration, with said binder strips respectively oriented with said non-adherent portions directed toward a free end of said carrier film at an outside of said rolled-up configuration.

15. A method of using the arrangement according to claim 1 for applying one of said binder strips onto a margin of a sheet of sheet goods, wherein said method comprises the following steps:

a) providing said strip-shaped carrier film in a rolled-up configuration, with said plurality of said binder strips arranged successively in a row thereon;

b) unrolling and moving said carrier film in a film advance direction, and sharply deflecting said carrier film over a binder strip release edge with a back surface of said carrier film opposite said binder strips in contact with said release edge, such that a respective one of said binder strips is released from said carrier film;

c) advancing said sheet of sheet goods; and d) adhering said respective binder strip released from said carrier film onto said margin of said sheet such that said non-adherent portion of said respective binder strip protrudes from said margin of said sheet.

16. The method of claim 15, wherein said step a) comprises rolling said carrier film onto a supply roll in such a manner that said adherent portion of each said binder strip is directed forward in said film advance direction of said carrier film.

17. The method of claim 15, wherein said step a) comprises rolling said carrier film onto a supply roll in such a manner that said non-adherent portion of each said binder strip is directed forward in said film advance direction of said carrier film.

18. The method of claim 15, further comprising a step e) of rolling up said carrier film onto a waste take-up roll downstream from said release edge after said binder strips have been removed from said carrier film.

19. The method of claim 18, further comprising positively driving said waste take-up roll to cause said unrolling and said moving of said carrier film in said step b).

20. The method of claim 19, further comprising sensing a registration mark on said carrier film or on said binder strips and responsively providing a first registration signal, providing a sheet registration signal when said sheet is advanced in said step c) into a proper position for carrying out said adhering in said step d), and controlling said positive driving of said waste take-up roll responsively to said first registration signal and said sheet registration signal.

21. The method of claim 15, further comprising mounting a binder strip supply apparatus for carrying out said steps a), b), c) and d) on a sheet folding machine, and slidingly adjusting a position of said binder strip supply apparatus on said sheet folding machine.

22. The method of claim 15, wherein said step c) comprises advancing said sheet in an unfolded condition in a sheet advance plane that is parallel and directly adjacent to said release edge.

23. The method of claim 15, wherein said step c) comprises folding and then advancing said sheet in a folded condition in a sheet advance plane that is parallel and directly adjacent to said release edge.

24. A combination of the arrangement according to claim 1 and an apparatus for supplying said binder strips to be adhered onto respective margins of sheets of sheet goods, said apparatus comprising a supply roll wherein said carrier film with a plurality of said binder strips removably adhered thereon is rolled onto said supply roll, a motor driven waste take-up roll, a carrier film advance path extending from said supply roll to said waste take-up roll, a binder strip release edge arranged along said carrier film advance path between said supply roll and said waste take-up roll such that said carrier film is sharply deflected over said release edge with a back surface of said carrier film opposite said binder strips in contact with said release edge, a sensor that is adapted to sense said registration marks provided on said carrier film or on said binder strips and that is arranged along said carrier film advance path, and a control unit connected to said sensor and to said motor-driven waste take-up roll.

25. The combination of claim 24, wherein said apparatus further comprises a sheet advance path that is adapted to have said sheets advanced therealong, and that extends parallel and directly adjacent to said release edge.

26. The arrangement of claim 1, wherein said adhesive release coating is provided on said carrier film between said adhesive of said binder strips and said carrier film.

27. The arrangement of claim 26, wherein said adhesive release coating comprises silicone.

28. The arrangement of claim 1, wherein said length of each said binder strip does not protrude beyond said width of said carrier film.

* * * * *